United States Patent Office 3,244,634
Patented Apr. 5, 1966

3,244,634
FLOOR CLEANER PRODUCT AND METHOD FOR MAKING SAME FROM ATTAPULGITE CLAY
James B. Duke, Metuchen, N.J., assignor to Minerals & Chemicals Philipp Corporation, Menlo Park, N.J., a corporation of Maryland
No Drawing. Filed Jan. 29, 1962, Ser. No. 169,664
11 Claims. (Cl. 252—88)

The present invention relates to an improved attapulgite clay sorbent product and to the method for producing the same, and relates especially to mineral sorbent particles of the type used as a floor cleaning agent.

Oily, greasy, or wet floors, especially those in garages and industrial plants, are commonly cleaned by spreading a layer of sorbent mineral particles over the area to be cleaned. The mineral particles with sorbed grease, oil, and/or water are then swept and discarded.

One of the mineral materials that finds widespread use in the production of floor cleaning sorbents is attapulgite clay, a unique type of clay material mined in Georgia and Florida. The raw clay as mined leaves much to be desired for use as a floor cleaning sorbent, and the clay normally undergoes a series of processing steps to put it into a form for which it is better suited for this use. For example, a floor cleaning sorbent, in addition to having good oil and water sorptivity, should be in the form of coarse aggregates, typically particles −10 +42 mesh (Tyler series), to facilitate application of the sorbent to the floor. These particles should be free from fines (i.e., particles 100 mesh or smaller) since the presence of fines will create a dust hazard. Moreover, the particles should be sufficiently hard or resistant to attrition that they will not break down appreciably into finer particles during use. The particles should also have as low a bulk density or volume weight as is consistent with adequate hardness since the lower the density of the sorbent, the greater is the floor coverage of the material on a unit weight basis.

To impart hardness and sorptivity to raw attapulgite clay and to put it into granular form, it is conventional to pug the clay with water to form an extrudable mixture, extrude the pugged clay to obtain pellets, calcine the pellets to harden them sufficiently to permit their grinding and to activate the clay, and then grind the calcined pellets and size them. The nature of the attapulgite clay pellets is such that when the pellets are calcined at a temperature and for a time to activate the clay, that is to bring out the optimum sorptivity of the clay, considerable fines are produced when the pellets are ground to reduce them into granules of the required mesh size. Therefore, the calcination step preceding the grinding step must be a two-stage operation, with the initial stage being in the nature of a drying operation and the second stage being a high temperature operation which activates the clay by removing a substantial quantity of chemically combined water. Even with the use of a double calcination step to minimize the production of by-product fines, in commercial practice as much as 15% to 25% of the starting attapulgite clay ends up in the form of fines. A small quantity of the fines can be recycled in the process and mixed with the extruder feed. However, the fines are composed of calcined clay which does not possess the extrusion properties of the raw feed clay. As a result, the majority of the by-product fines represents waste material for which there is a very limited market.

From this brief description of the prior art commercial method for making an attapulgite clay floor cleaner, it will be readily apparent to those skilled in the art that processing costs add appreciably to the cost of the raw attapulgite clay. Thus, insofar as processing steps are concerned, extrusion is a rather expensive process, especially since the raw clay feed contains abrasive impurities which wear out the die plate of the extruder, necessitating rather frequent replacement of the equipment. Double calcination is also uneconomical for obvious reasons. Added to these costs is the added expense represented by wastage of raw materials as by-product fines on which expensive extrusion and calcination treatments have been expended.

As for the floor cleaning granules obtained from attapulgite clay by extrusion, calcination and grinding, they possess excellent oil and water sorptivity and adequate hardness. The extrusion step which enhances the sorptivity of the finished calcined clay also results in a moderate and desirable decrease in bulk density of the calcined clay. Thus, for example, a commercial calcined attapulgite clay which will have a bulk density of say 35 lbs./ft.$^3$ if it has not been extruded will have a bulk density of the order of 30 lbs./ft.$^3$ if it has also been subjected to extrusion. However, the bulk density of the extruded calcined granules still leaves much to be desired. While many attempts have been made in the past to produce heat activated attapulgite clay granules of even lower bulk density, no commercially feasible method has been advanced which markedly reduces bulk density without adversely affecting other desirable properties of the material.

Accordingly, an object of this invention is the provision of an improved process for producing an attapulgite clay sorbent product which overcomes the above-mentioned difficulties and disadvantages of the extrusion process. A more particular object of this invention is the provision of such a process which obviates the need for expensive extrusion equipment and which may be carried out with a single calcination step.

Yet another important object is the provision of a method for making attapulgite clay sorbent aggregates which results in an exceptional reduction in the quantity of by-product or waste fines.

Still another object of this invention is the provision of thermally activated attapulgite clay sorbent aggregates which have a considerably lower bulk density than prior art activated attapulgite clay sorbent aggregates obtained by extrusion, whereby the covering power of a unit weight of sorbent particles is considerably increased.

A further object of this invention is the provision of sorbent aggregates of heat activated attapulgite clay in a novel form and shape such that they have adequate attrition resistance coupled with extremely low bulk density and excellent water and oil retention.

Other objects and advantages of this invention will be apparent from the description thereof which follows.

Briefly stated, the process for producing an improved floor cleaning product from attapulgite clay, in accordance with the subject invention, comprises the following five essential steps: (1) a colloidal grade of attapulgite clay is moistened with water to a plastic consistency, a flocculating agent preferably being intimately incorporated into the moistened clay; (2) the moist clay is continuously fed into the bite formed between hard unyielding surfaces of counterrotating rolls rotating under tension controlled to compress moist clay passing through the bite to a thickness within the limits of about 0.025 inch to about 0.050 inch; (3) moist clay thus compressed is continuously scraped simultaneously from the surface of each of the rolls at a point beyond the bite so as to prevent repassage of the clay through the bite, thereby forming a multiplicity of cohesive flakelike particles of moist clay; (4) the flakes are calcined at a temperature and for a time sufficient to thermally activate the clay; and (5) the calcined flakes are crushed and sized to recover particles of the desired mesh size.

By the procedure briefly described above, there is obtained without the necessity for extrusion or double calcination a yield of at least about 90% of activated attapulgite clay sorbent aggregates. These particles have a thickness within the limits of about 0.015 inch to about 0.025 inch, the particles issuing from the rolls at about 0.025 inch to about 0.050 inch thickness having undergone shrinkage during calcination. The width of the particles in the calcined product is within the range of about 0.05 inch to about 0.13 inch and is controlled by the crushing and sizing operation. Particles having dimensions of this order, and which have been processed as described above, have a bulk density (defined hereinafter) within the range of about 16 to about 22 lbs./ft.$^3$. These values are about 25% less than the density of granules of the same mesh size obtained by extrusion, followed by calcination and grinding. Therefore, attapulgite clay sorbent particles of this invention have considerably greater floor covering power than prior art attapulgite clay floor cleaners. The oil and water sorptivity of the novel sorbent particles on a weight basis is the same or better than granules obtained by extrusion. Their hardness is generally the same as or somewhat less than that of prior art attapulgite clay floor cleaning granules, but is sufficient to assure minimal particle breakdown during use. When a suitable flocculant has been incorporated into the moist clay feed, in accordance with a preferred form of this invention, the hardness of sorbent particles of a given bulk density will generally be improved.

More specifically, the starting clay employed in carrying out the process of the subject invention may be any grade of colloidal attapulgite clay. By the term "colloidal attapulgite clay" is meant attapulgite clay which has never been dried to a free moisture content below about 7%. "Free moisture" or F.M. is the weight percentage of the clay that is eliminated by heating the clay to constant weight at about 220° F. The clay may be raw clay which has undergone no preliminary refinement. The F.M. of raw clay is usually about 44% and its V.M. is about 50%, the term "V.M." referring to volatile matter, which is the weight percentage of a material that is eliminated by heating the material to essentially constant weight at 1800° F. In the case of clay per se, water accounts substantially completely for volatile matter.

It is essential to restrict the quantity of water used to moisten the clay to an amount which suffices to provide a thick plastic mass with the colloidal clay. In practice, the quantity of water added to the clay will be such as to provide a clay mixture having a total V.M. within the very narrow range of about 55% to about 65%. Especially preferred is a mix having a V.M. within the range of 59% to 63%. Mixes having a V.M. in excess of about 63% will generally result in a product which is softer than the product obtained from the same feed adjusted to a somewhat lower V.M. content. On the other hand, operating with a V.M. below about 59%, the product will generally be heavier than if a somewhat higher V.M. were used.

While the feed to the counterrotating rolls may consist merely of attapulgite clay and the quantity of water above set forth, a striking improvement in product quality, with an accompanying improvement in processing efficiency, will result if a water-soluble chemical flocculating agent is intimately incorporated with the clay and water. Thus, the general process of this invention loses much of its effectiveness when a flocculating agent is not present in the moist clay feed.

The term "flocculant" as used herein refers to an agent which increases the interparticle attraction between the negatively charged clay particles and thus causes the clay particles to aggregate. Thus, the incorporation of a flocculant into a clay-water system results in a distinct thickening or bodying of the system. Therefore, a clay-water system at a given V.M. level will be thicker when it contains a flocculant. Since the action of the flocculating agent on the clay-water system is a physical one, several distinct classes of chemical substances will suffice. One class, the acids and acid salts, such as, for example, alum, function by reducing the pH of the system far below the isoelectric point of the clay which is usually at a pH of about 7.5 to 8. On the other hand, certain basic substances, such as, for example, sodium hydroxide, flocculate by increasing the pH far above the isoelectric point. Of course, bases must be incorporated in sufficient amount to achieve flocculations rather than dispersion (deflocculation) which will occur if bases are used in smaller amount. Certain surface active agents, e.g., salts of amines of higher fatty acids and soaps, are also satisfactory and they probably flocculate through a hydrophobic particle filming effect. Polymeric organic flocculants, such as coagulant grades of poly(ethylene oxide), should also be useful. Small quantities of compounds of divalent metals, such as mineral acid salts of divalent metals, and oxides and hydroxides of calcium and magnesium, can be used. For economic reasons, the preferred flocculating agents are mineral acids, especially sulfuric acid or sulfur dioxide solutions, and also sodium soaps of higher fatty acids and/or resin acids (e.g., resin and fatty acids having from 17 to 22 carbon atoms, such as, for example, sodium tallate, sodium oleate). Suitable proportions of flocculants are as follows, where quantities are based on the weight of the clay, 50% V.M. clay basis: NaOH, ½% to 3%; $H_2SO_4$ (100% acid basis), 1% to 5%; tall oil soap, 1% to 5%. Compounds, such as calcium oxide or hydroxide, magnesium oxide or hydroxide, are usually used in amount of about 0.5% to 3% of the clay weight. Suitable levels of flocculating agents can be readily determined by simple experimentation in which the consistency of the system is observed. Normally, the flocculating agent is dissolved in water before mixing water with the clay to adjust the V.M. of the clay to the desired level.

In putting the invention into practice, attapulgite clay having a V.M. of say 45% to 55% is passed from a storage bin to a roll crusher which crushes the clay to relatively small fragments, typically 2 inches to 4 inches. The crushed earth is fed to a pug mill in which the clay is mixed with a small amount of an aqueous solution of a flocculating agent. The concentration of the solution of flocculant is adjusted to bring the V.M. of the mixture to within the range of about 55% to 65%.

The resultant pug is fed uniformly through the length of the bite or nip between smooth surfaced counterrotating rolls. The rolls, which preferably have equal diameters, are rotatably supported at each end as by journalled shafts. The desired clearance between the rolls is maintained by means of spring tension operating against an adjustable stop or shim. The clearance between the rolls when no feed is being passed through the bite can be within the range of 0 to about 0.01 inch and should be controlled by spring tension to a maximum of about 0.01 inch during operation. Since the compressed plastic clay tends to expand after passing between the rolls, the clearance between the rolls is less than the desired thickness of the compressed clay mass. The rolls are preferably geared to rotate at the same peripheral speed in order to prevent shearing of the moist clay. The rolls must have a smooth hard unyielding surface. Iron or steel can be used. The rolling operation is carried out cold without heating of the rolls or clay in order to avoid any drying effect which would be detrimental to the product since the plasticity of the feed should be maintained during the rolling operation.

The pug issues from the bit between the rolls as a compacted coherent film which tends to adhere to surfaces of the rolls. This film is scraped simultaneously from each roll by means of doctor blades mounted tangentially to the rolls with the scraping edge coextensive with and in surface contact with the periphery of the rolls. It appears that best results will be obtained when the angle which the blade makes with roll srface is an acute angle, say about 15 degrees.

The action of the knife blade against the surface of the roll is to remove a freshly compressed portion of moist feed clay from the roll. The nature of the clay feed is such that the clay is removed from each roll in the form of discrete coherent flakes, as opposed to ribbons or sheets. These flakes are of substantially uniform thickness which is within the range of about 0.025 inch to 0.50 inch.

The moist clay flakes are discharged from each of the rolls into a suitable hopper and are then passed through a calciner in which the flakes are calcined, preferably at a temperature within the range of about 800° F. to about 1200° F. to a V.M. of about 3% to 5%. In some instances, it may be desirable to calcine the flakes to a higher or lower V.M., say a V.M. as low as about 1% or as high as about 10%. The material from the calciner is cooled and then screened. The oversize flakes from the screening operation are passed to a corrugated hard surfaced roller mill to be reduced to particles of the desired mesh size, screened, and particles of the desired mesh size passed to storage. Fines, which normally account for less than 10% and frequently only 5%, of the feed clay are discarded or returned to the pug mill. Milling and screening are normally adjusted to provide a product which is about 100% −4 mesh and about 100% +42 mesh (Tyler series). The particle size of this product may vary to some extent within this range, e.g., −8 +32 mesh, −9 +32 mesh, and −12 +42 mesh. Generally speaking, particles coarser than about 10 mesh will be somewhat higher in density than particles of the same composition which are 10 mesh or finer.

The following examples are given to further illustrate this invention and to show its advantages over those employed heretofore. These examples are merely illustrative and are not to be considered as limiting the scope of the invention.

EXAMPLE I

In the accompanying table are shown properties of sorbent particles obtained by treating raw attapulgite clay from a deposit near Attapulgus, Georgia, by the roll compression technique of this invention, with and without flocculating agent. For purposes of comparison, there are included properties of granulated extruded attapulgite clay of the prior art.

The general procedure for producing flaked products of this invention was as follows. Raw run of mine clay after primary crushing was pugged with water to a V.M. of about 58%. This mixture was repugged with water or aqueous solution of flocculant employing quantities of water and/or flocculant reported in the table. The pug was passed through the bite between smooth steel surfaced rolls under high spring tension controlled to compress the feed to a thickness within the range of 0.025 inch to 0.050 inch. After passing the clay through the rolls, it was removed in flake form from each roll with steel doctor blades mounted tangentially to each roll at an angle of about 15 degrees. The flakes were calcined at a temperature within the range of about 1050° F. to 1100° F. for 30 minutes in a muffle calciner or rotary calciner to a V.M. of 3% to 4% and screened.

Control granules were obtained by extruding the same raw clay, previously pugged with water, through an orifice to make pellets about ⅜″ x ⅜″. The extruded pellets were rotary calcined at 1050° F. for 30 minutes to a V.M. of 3% to 4%, crushed and screened.

The data tabulated in the table show that the volume weight of flakes produced in accordance with this invention from raw clay without flocculant (Sample 2) was about 3.2 lbs./ft.³ lighter than control granules (Sample 1) of the same mesh size. The oil retention value of the 10/42 mesh flakes (Sample 2) was 107%, an increase of about 14% over that of the 10/42 mesh granules made without flaking (Sample 1). The hardness of Sample 2 was somewhat lower than Sample 1. The product yield in the case of Sample 2 was considerably better than the yield of Sample 1 which was made in accordance with the prior art.

A comparison of the properties of flaked absorbents made with and without sodium hydroxide flocculant (Samples 2 through 5) shows that the addition of caustic at the 0.5% to 3% level resulted in a decrease in density in each instance, with the greatest decrease at the 1% to 3% sodium hydroxide level where a reduction of 5.4 to 5.6 lbs./ft.³ was effected through the use of flocculant with an accompanying increase of 10% to 14% in hardness. At the 0.5% level the improvement in hardness resulting from sodium hydroxide addition was not as remarkable. In all instances, the use of sodium hydroxide in the pugged feed to the rolls increased product recovery from the 88.9% value obtained without addition of caustic or other flocculant.

Samples of 10/42 mesh flaked attapulgite clay sorbent made up with sulfuric acid as the flocculant (Samples 6 and 7) were generally superior to Sample 2 made up without any flocculant and were markedly superior to control 10/42 mesh granules (Sample 1). Especially good were results obtained with 5% sulfuric acid where there was a 95% recovery of a material having a volume weight of 21.4 lbs./ft.³, which was 3.7 lbs./ft.³ lighter than the prior art absorbent (Sample 1) at the same hardness value of 60%. Results obtained with 5% sulfuric acid (Sample 6) corresponded substantially with those realized by pugging the raw clay with saturated sulfur dioxide water before flaking (Sample 8) where a 94.8% yield of a product having a bulk density of 21.8 and a hardness value of 60% was obtained. Sample 9, obtained with 4% sulfuric acid flocculant at a higher V.M. level than other samples made with the acid, had a exceptionally low bulk density value of 17.7 lbs./ft.³, although the hardness was somewhat less.

The tabulated data show that absorbent products having a low bulk density value of about 16 to 20 lbs./ft.³ and a hardness comparable or better than control granules could be produced with 1% to 5% tall oil soap incorporated into the moist clay feed to the roll crusher. In all instances the product recovery was very high, with recoveries of the order of about 94% to 96% being obtained with tall oil soap addition.

EXAMPLE II

This example illustrates the necessity for controlling the clearance between the rolls in carrying out the process of this invention.

The general procedure used in preparing Sample 2 was duplicated in full with the exception that the rolls were maintained at a constant clearance of about 0.017 inch. The yield of 10/42 mesh product was 91.3%, as compared with a yield of 88.9% obtained with the rolls under high spring tension and zero clearance when no feed was being passed between the bite between the rolls. However, the bulk density of the product obtained operating the rolls at 0.017 inch clearance was 25.1 lbs./ft.³ which is about the same as the density of control granules obtained by prior art extrusion and is considerably higher than the bulk density of 21.9 lbs./ft.³ for Sample 2. This data therefore show that a low bulk density flaked absorbent product is not obtained when the clearance between the flaking rolls is too great.

The method for determining hardness values used herein is described in U.S. Patent No. 2,665,259 to Buffett. Oil retention values refer to the increase in weight of absorbent sample, expressed as a percent of the original sample, when subjected to the procedure described in said patent to Buffett. Water retention values were measured by the same general procedure used in determining oil retention values with water being substituted for the oil. Mesh sizes are those obtained with Tyler standard screenscale sieves. Bulk density values refer to values obtained by the fall method described below.

*Determination of the volume weight or bulk density of coarse granular materials by the fall method*

SUMMARY

The volume weight or bulk density is determined by pouring the sample directly into a 100 cc. graduate cut off at the 100 cc. mark, from a fixed height, and determining the weight of the 100 cc. volume. This applies only to materials coarser than 60 mesh.

APPARATUS 1 ring stand with 2 burette clamps
1 100 cc. graduate cut off at the 100 cc. mark and tared
1 straight glass tube, ½" I.D. x 24" long
1 1 pt. funnel
1 150 cc. beaker
1 balance, sensitivity 0.1 gram
1 straight edge or spatula

PROCEDURE (1) Set up the glass tube in the burette clamps on the ring stand in a vertical position, with its bottom one inch (1") from the top of the graduate. Attach the funnel to the top of the tube.
(2) Place the graduate under the tube and pour approximately 125 cc. of the clay sample into the funnel.
(3) Remove the excess clay from the top of the graduate by passing a straight edge or spatula horizontally over the top, being careful not to pack the clay into the graduate.
(4) Wipe the outside of the graduate carefully to remove adhering clay.
(5) Weigh the graduate and clay, and subtract the tare weight.
(6) Repeat determination, using for the calculation, the average of three determinations.

CALCULATION

The fall volume weight (F.V.W.), expressed in lbs. per cu. ft., is calculated as follows:

$$F.V.W. = 0.624 \times \text{weight (5) in grams}$$

without heating, continuously feeding said plastic mixture into the bite between hard and smooth surfaced counterrotating rolls rotating at the same peripheral velocity and under tension so controlled as to press said mixture to a thickness within the limits of about 0.025 inch to about 0.050 inch, and simultaneously continuously scraping the pressed mixture from each of said rolls so as to remove pressed mixture therefrom in the form of coherent flaked aggregates.

2. The method of claim 1 wherein a flocculant is intimately incorporated into said moist clay mixture.

3. The method of claim 1 wherein the V.M. of said mixture is within the limits of about 55% to about 65%.

4. A method for producing an improved sorbent useful as a floor cleaner which comprises:

forming a moist plastic mixture comprising colloidal attapulgite clay and water, without heating, feeding said plastic mixture into the bite between hard and smooth surfaced counterrotating rolls rotating at the same peripheral velocity and under tension so controlled as to press said mixture to a thickness within the limits of about 0.025 inch to about 0.050 inch, simultaneously scraping the pressed mixture from each of said rolls tangentially at a position beyond the bite between said rolls so as to remove pressed mixture therefrom in the form of coherent flaked aggregates, calcining said flaked aggregates, and crushing said calcined aggregates to obtain an absorbent product of the desired mesh size.

5. A method for producing an improved absorbent useful as a floor cleaner which comprises:

forming a moist plastic mixture consisting essentially of colloidal attapulgite clay, water and a small amount of a flocculating agent for said clay, said mixture having a V.M. within the limits of 55% to 65%, without heating, continuously feeding said plastic mixture into the bite between hard and smooth surfaced counterrotating rolls rotating at the same peripheral velocity under tension so controlled as to press said

*Properties of attapulgite clay floor cleaning absorbents*

| Sample Number | | Properties | | | | | | |
|---|---|---|---|---|---|---|---|---|
| | | V.M.,[a] percent | Mesh | Yield, percent | Bulk Density (Calcined), lbs./ft.[3] | Hardness, percent | Water Retention Value, percent | Oil Retention Value, percent |
| | PRIOR ART FLOOR CLEANER | | | | | | | |
| 1 | Extruded clay (control) | 58.1 | 10/42 | 82.0 | 25.1 | 60.0 | 180 | 93 |
| 1A | ---do--- | 58.1 | 8/32 | 80.6 | 26.6 | 58.0 | | 88 |
| | IMPROVED FLOOR CLEANER | | | | | | | |
| 2 | Pugged clay, flaked | 61.9 | 10/42 | 88.9 | 21.9 | 42.0 | 208 | 107 |
| 3 | Pugged clay, repugged 3% NaOH, flaked [b] | 61.9 | 10/42 | 92.5 | 19.7 | 56.0 | | |
| 4 | Pugged clay, repugged 1% NaOH, flaked [b] | 61.9 | 10/42 | 92.1 | 19.5 | 52.0 | | |
| 5 | Pugged clay, repugged 0.5% NaOH, flaked [b] | 61.9 | 10/42 | 94.1 | 20.3 | 46.0 | | 101 |
| 6 | Pugged clay, repugged 5% H$_2$SO$_4$, flaked [b] | 60.3 | 10/42 | 95.0 | 21.4 | 60.0 | | |
| 7 | Pugged clay, repugged 2.5% H$_2$SO$_4$, flaked [b] | 61.9 | 10/42 | 95.0 | 20.3 | 54.0 | | 113 |
| 8 | Pugged clay, repugged Sat. SO$_2$, flaked [b] | 60.3 | 10/42 | 94.8 | 21.8 | 60.0 | | |
| 9 | Pugged clay, repugged 4% H$_2$SO$_4$, flaked [b] | 62.4 | 8/32 | 96.4 | 17.7 | 56.0 | | |
| 10 | Pugged clay, repugged 5% tall oil soap, flaked [b] | 64.6 | 8/42 | 96.3 | 15.6 | 50.0 | | |
| 11 | Pugged clay, repugged 1% tall oil soap, flaked [b] | 64.3 | 8/42 | 94.6 | 19.3 | 68.0 | | |
| 12 | Pugged clay, repugged 0.5% tall oil soap, flaked [b] | 58.5 | 8/42 | 96.1 | 19.2 | 56.0 | | |

[a] Reported as V.M. of clay during extrusion (Sample 1); reported as V.M. of feed to rolls (Samples 2 to 12).
[b] All percentages based on weight of raw clay containing 50% V.M.

I claim:

1. In a method for making a sorbent product from attapulgite clay in which the clay is calcined to improve its sorptivity and then sized, the improvement which comprises:

forming a moist plastic mixture comprising colloidal attapulgite clay and water, mixture to a thickness within the limits of about 0.025 inch to about 0.050 inch, simultaneously scraping the pressed mixture from each of said rolls tangentially at a position beyond the bite between said rolls so as to remove pressed mixture from said rolls in the form of coherent flaked aggregates, calcining said flaked aggregates, and
crushing said calcined aggregates to obtain an absorbent product of the desired mesh size.

6. The method of claim 5 wherein said flocculating agent is an acid.

7. The method of claim 6 wherein said acid is sulfuric acid.

8. The method of claim 6 wherein said acid is sulfur dioxide.

9. The method of claim 5 wherein said flocculating agent is a surface active agent.

10. The method of claim 9 wherein said surface active agent is a water dispersible alkali metal salt of a fatty acid containing from about 17 to 22 carbon atoms.

11. The method of claim 5 wherein said flocculating agent is sodium hydroxide employed in an amount of at least about 0.5%, based on the weight of said clay and sufficient to thicken said mixture of water and clay when incorporated therewith.

References Cited by the Examiner

UNITED STATES PATENTS

| | | | |
|---|---|---|---|
| 313,572 | 3/1885 | Birch | 241—227 XR |
| 1,308,007 | 6/1919 | Forsythe | 241—227 |
| 1,713,487 | 5/1929 | Torrance | 241—227 |
| 2,470,346 | 5/1949 | Frankenhoff | 252—88 XR |
| 2,848,422 | 8/1958 | Donovan et al. | 252—450 |
| 3,016,355 | 1/1962 | Robinson et al. | 252—450 |
| 3,050,863 | 8/1962 | Allegrini et al. | 23—100 XR |
| 3,123,575 | 3/1964 | Stover et al. | 252—450 |

JULIUS GREENWALD, *Primary Examiner.*

J. T. FEDIGAN, *Assistant Examiner.*